(12) United States Patent
Firtion et al.

(10) Patent No.: US 7,748,397 B2
(45) Date of Patent: Jul. 6, 2010

(54) MOTOR VEHICLE FUEL TANK

(75) Inventors: Eric Firtion, Villers sur Coudun (FR);
Patrice Baudoux, Flavy le Martel (FR);
Alexis Rosseel, Suwon (KR)

(73) Assignee: Inergy Automotive Systems Research (Societe Anonyme), Brussels (BE)

( * ) Notice: Subject to any disclaimer, the term of this patent is extended or adjusted under 35 U.S.C. 154(b) by 676 days.

(21) Appl. No.: 10/498,357

(22) PCT Filed: Dec. 11, 2002

(86) PCT No.: PCT/EP02/14071

§ 371 (c)(1),
(2), (4) Date: Jun. 18, 2004

(87) PCT Pub. No.: WO03/053731

PCT Pub. Date: Jul. 3, 2003

(65) Prior Publication Data

US 2005/0217735 A1  Oct. 6, 2005

(30) Foreign Application Priority Data

Dec. 21, 2001  (FR) .................................. 01 16892

(51) Int. Cl.
*F16K 43/00*  (2006.01)
(52) U.S. Cl. .................... 137/15.17; 137/587; 137/590; 403/375
(58) Field of Classification Search .............. 137/15.17, 137/202, 43, 587, 590; 403/329, 363, 375, 403/381
See application file for complete search history.

(56) References Cited

U.S. PATENT DOCUMENTS

| 4,362,476 | A | * | 12/1982 | Kemmner et al. ........... 137/587 |
| 4,989,629 | A | * | 2/1991 | Shirakawa .................. 137/202 |
| 5,192,143 | A | * | 3/1993 | Lajara et al. ................ 403/381 |
| 5,277,217 | A | * | 1/1994 | Kobayashi et al. ............ 137/39 |
| 5,522,417 | A | * | 6/1996 | Tomioka et al. ............... 137/43 |
| 6,035,883 | A | * | 3/2000 | Benjey ....................... 137/202 |

(Continued)

FOREIGN PATENT DOCUMENTS

FR  2 786 224  5/2000

(Continued)

OTHER PUBLICATIONS

U.S. Appl. No. 11/719,264, filed May 14, 2007, Baudoux.

(Continued)

*Primary Examiner*—Stephen Hepperle
*Assistant Examiner*—Craig Price
(74) *Attorney, Agent, or Firm*—Oblon, Spivak, McClelland, Maier & Neustadt, L.L.P.

(57) ABSTRACT

An assembly of two components configured to be in contact with hydrocarbons, and a fuel tank including the assembly. The assembly includes a casing or a retaining member fastened to the casing, each of the two components including at least one fastening part configured to interact, and at least one of the components being made from a material configured to swell through action of the hydrocarbons, thus reinforcing retention of the components on one another. A method for manufacturing such a tank includes assembling the two components in the absence of fuel, and then bringing the two components into contact with the fuel.

22 Claims, 8 Drawing Sheets

U.S. PATENT DOCUMENTS

Figure 1:
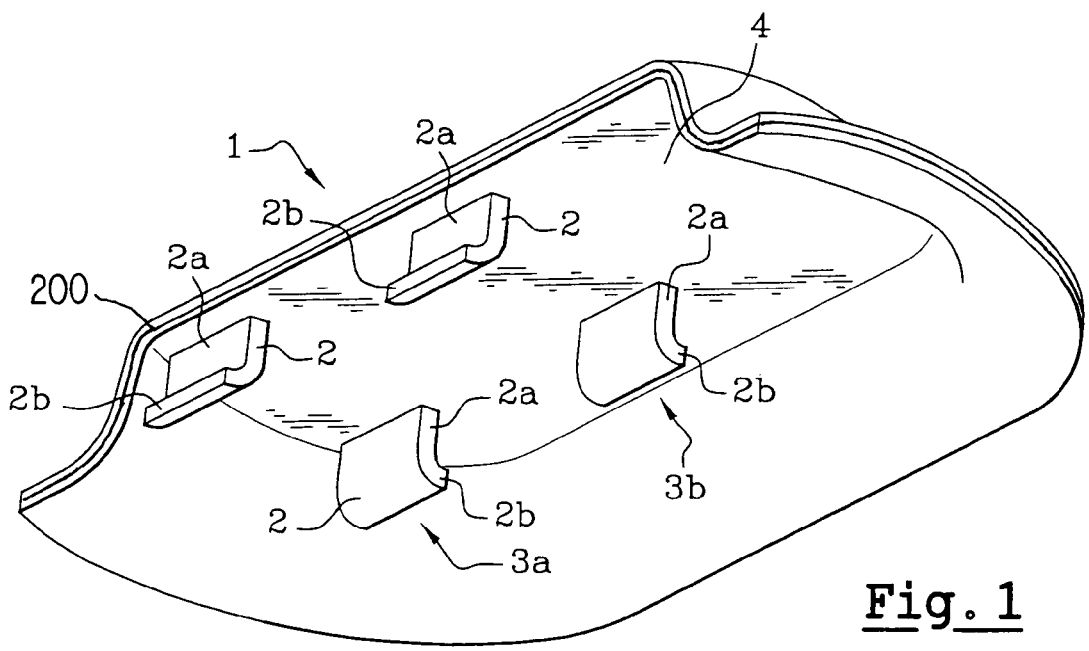

| | | |
|---|---|---|
| 6,273,070 B1 | 8/2001 | Arnal et al. |
| 6,286,539 B1 * | 9/2001 | Nishi et al. .................. 137/202 |
| 6,289,915 B1 * | 9/2001 | Nulman et al. ................. 137/43 |
| 6,499,500 B2 * | 12/2002 | Rosseel ................... 137/15.17 |
| 6,592,100 B2 * | 7/2003 | Chou et al. ................... 137/43 |
| 2001/0047822 A1 | 12/2001 | Aoki et al. |
| 2002/0011271 A1 | 1/2002 | Taurel et al. |
| 2002/0043533 A1 | 4/2002 | Gombert et al. |
| 2004/0045962 A1 | 3/2004 | Firtion et al. |

FOREIGN PATENT DOCUMENTS

| | | |
|---|---|---|
| JP | 11-321353 | 11/1999 |
| JP | 2000-266208 | 9/2000 |
| JP | 2001-47499 | 2/2001 |
| JP | 2001-293772 | 10/2001 |
| JP | 2001-329924 | 11/2001 |

OTHER PUBLICATIONS

U.S. Appl. No. 11/996,803, filed Jan. 25, 2008, Bousquet, et al.

* cited by examiner

MOTOR VEHICLE FUEL TANK

The subject of the present invention is an assembly of at least two components which are intended to be in contact with fuel, in particular hydrocarbons.

A fuel tank generally comprises, in addition to a casing intended for storing the fuel, several elements intended to perform other functions, in particular degassing, measuring of the fuel level in the tank, supplying fuel to the engine and regulating the pressure of the fuel leaving the tank.

The various elements allowing these functions to be performed are generally welded directly onto the casing of the tank or assembled by means of retaining members such as nuts, this situation not being completely satisfactory with regard to the regulations pertaining to hydrocarbon emissions.

The present invention is aimed particularly at simplifying the assembly of the various elements of a fuel tank and making this assembly more reliable.

The invention is also aimed at making it possible to reduce hydrocarbon emissions.

The invention achieves these objectives by virtue of a novel assembly of at least two components which are intended to be in contact with hydrocarbons, one of the components consisting of a fuel tank casing or a retaining member fastened to this casing and the other component consisting of an element attached on the inside of this casing, the two assembled components each comprising at least one fastening part which are capable of interacting in order to retain one of the components on the other, the assembly being characterized in that at least one of the components is made from a material capable of swelling through the action of the said hydrocarbons, the fastening parts being arranged such that the swelling of at least one of them trough the effect of the said hydrocarbons tends to reinforce the retention of one of the components on the other.

The retaining member may be fastened to the casing by any suitable means. A retaining means which has given good results is welding.

The attached element may be any element which can be incorporated in a tank. For example, this attached element may be a valve or else a fuel gauge.

By virtue of the invention, the two components can be assembled in a simple manner, for example by latching, without thereby running the risk of subsequent detachment through the effect of vehicle vibrations when the vehicle is in motion for example, by virtue of the locking obtained by the swelling of one of the components or of both components in contact with the hydrocarbons.

Where appropriate, it is possible by virtue of the invention to produce the casing of the tank with at least one layer forming a barrier in relation to the fuel and to fasten the attached elements to this casing without impairing the barrier-forming layer, which allows a reduction in hydrocarbon emissions.

The components can be positioned manually without a specific tool.

In one embodiment of the invention, the fuel-contact swelling properties of the materials used to make the fastening parts are different, which may make it possible for example to more easily control the way in which the assembly progresses in contact with the fuel.

The casing or the retaining member is preferably made from a material having a great tendency to swell than the material from which the attached element is made.

Each of the two components may comprise only a single fastening part, for example a sphere portion or a spherical cavity, which are capable of interacting in order to form a fastening having the function of a ball joint.

The two components may also comprise more than one fastening part. In this case, a preferred embodiment is one in which each component bears two fastening parts.

In a preferred embodiment of the invention, the fastening parts may also be made from a material comprising the same polymer substance, but comprising different quantities of fillers from one material to the other, however.

Thus, the fastening parts may be made from HDPEs, respectively without a filler and containing a filler, particularly a glass fibre or talc filler.

Other materials may also be used, particularly polyacetal, polyamide or PBT.

The fastening parts may also be made from materials comprising different polymer substances, for example HDPE and polyacetal, respectively.

As a variant, the materials used to make the fastening parts are identical.

When one of components consists of a retraining member welded onto the casing of the tank, the retaining member and the casing are advantageously made from materials having substantially identical swelling properties, being made, for example, from the same material, particularly HDPE. Thus, the retaining member and the casing behave similarly under the action of the fuel, which limits differential deformations between these two elements which are liable to weaken the retention of the retaining member on the casing.

One fasting part may comprise, for example, at least two outer bearing surfaces between which and in contact with which can be fastened two inner bearing surfaces belonging to the other fastening part when the two components are assembled.

In one exemplary embodiment of the invention, there are at least four outer bearing surfaces grouped in pairs, the outer bearing surfaces of the same pair being situated opposite one another, and there are also at least four inner bearing surfaces of the other fastening part which are grouped in pairs, the inner bearing surfaces of the same pair being situated opposite one another, each inner bearing surface of one fastening part being able to engage on an outer bearing surface of the other fastening part.

One of the fasting parts may be fastened to the other by being positioned manually by a sliding movement, for example, without specific tooling.

When one of the components of the assembly is a valve, this sliding movement is for example parallel to the axis of a nozzle serving to connect the valve to a hose, which may make it possible to facilitate handling of the valve when positioning it.

The inner bearing surfaces, which are produced on the casing of the rank for example, may be grouped in pairs as indicated above and, within the same pair, each inner bearing surface may comprise at least one bend pointing in the opposite direction to the other inner bearing surface.

The outer bearing surfaces may comprise grooves in which the said bends of the inner bearing surfaces can engage.

At least one of these grooves may be formed between two parallel ribs.

As a variant, at least one of these grooves is formed between a bend of an outer bearing surface and the wall to which this bearing surface is connected.

One of the components may comprise at least one latching relief capable of latching onto the other component at the end of the assembling movement, which is for example a sliding movement as indicated above.

This or these reliefs may be home by one of the fastening parts and may be situated for example at one end of the aforementioned grooves, being produced for example on the outer or inner bearing surfaces themselves or on walls to which these bearing surfaces are connected.

The relief or reliefs in question may comprise an inclined flank which can be easily crossed when one of the fastening parts is moved with respect to the other during assembly and a straight flank which opposes disassembly of the two components after the said inclined flank has been crossed.

One of the components may comprise, in addition to at least one latching relief as explained above, at least one stop against which the other component bears at the end of the assembling movement.

Such a stop may be formed for example at the end of a groove as defined above and may additionally serve to consolidate the local structure of the component in the region of this groove.

When one of the components is a valve, the inner bearing surfaces may be produced in a recess of the casing of the tank and be connected to a planar wall forming the bottom of the said recess.

When one of the components is a fuel gauge support, the inner bearing surfaces may be produced on a rib forming a projection on the inner surface of the casing of the tank and extending substantially perpendicular to this inner surface.

In one exemplary embodiment of the invention, the fastening parts of the assembly are arranged in such a way as to interact by latching in order to retain one of the components on the other.

One of the fastening parts may comprise at least one elastically deformable tab capable of latching onto the other component.

When one of the components consists of a retaining member, the latter may comprise a tubular wall welded onto the casing of the tank by one end and having an annular bulge directed radially outwards at the other end, elastically deformable tabs of the attached element being able to bear on this bulge.

The attached element may comprise an inner skirt capable of engaging in the tubular wall of the retaining member and an outer skirt to which the elastically deformable tabs are connected.

In this exemplary embodiment, the latching movement may be parallel to the axis of the tubular wall of the retaining member.

In a specific embodiment of the invention, one of the components comprises at least one relief capable of opposing a rotation of one of the components with respect to the other when these components are assembled.

In particular, when one of the fastening parts is produced with the casing of the tank, the other fastening part may comprise two pairs of ribs, which are intended to bear on the casing of the tank, particularly a first pair of ribs which are parallel to the direction in which one of the components is positioned on the other and a second pair of ribs which are arranged on either side of the first pair of ribs and oriented substantially perpendicular to the direction in which one of the components is positioned on the other.

Another subject of the invention is a motor vehicle fuel tank, characterized in that it comprises an assembly as defined above, the second component consisting of an attached element selected from a valve and a fuel gauge.

The casing of the tank may be produced by injection-moulding thermoplastic material or by blow-moulding or roto-moulding.

The casing of the tank may comprise, for example, two half-shells produced by injection-moulding thermo plastic material and assembled by welding.

Another subject of the invention is a method of manufacturing a motor vehicle fuel tank, characterized in that it comprises the following steps;

a) assembling two constituent components of the tank before brining them into contact with the fuel, the two components each comprising fastening parts which are capable of interacting in order to retain one of the components on the other, at least one of the components being made from a material capable of swelling through the action of the fuel, b) bringing the said components into contact with the fuel so as to cause a swelling of at least one of the fastening parts and a reinforcing of the retention of one of the components on the other.

Figure 2:
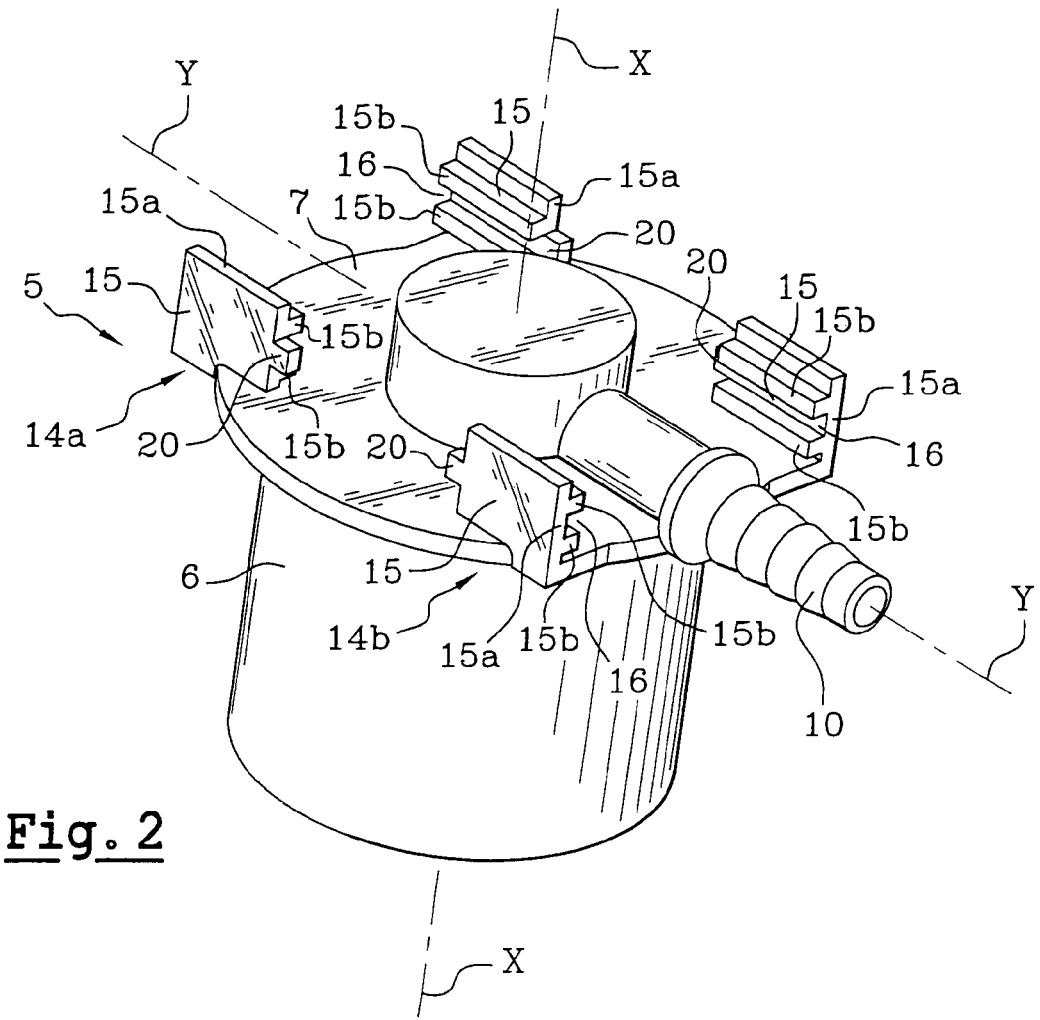
Figure 3:
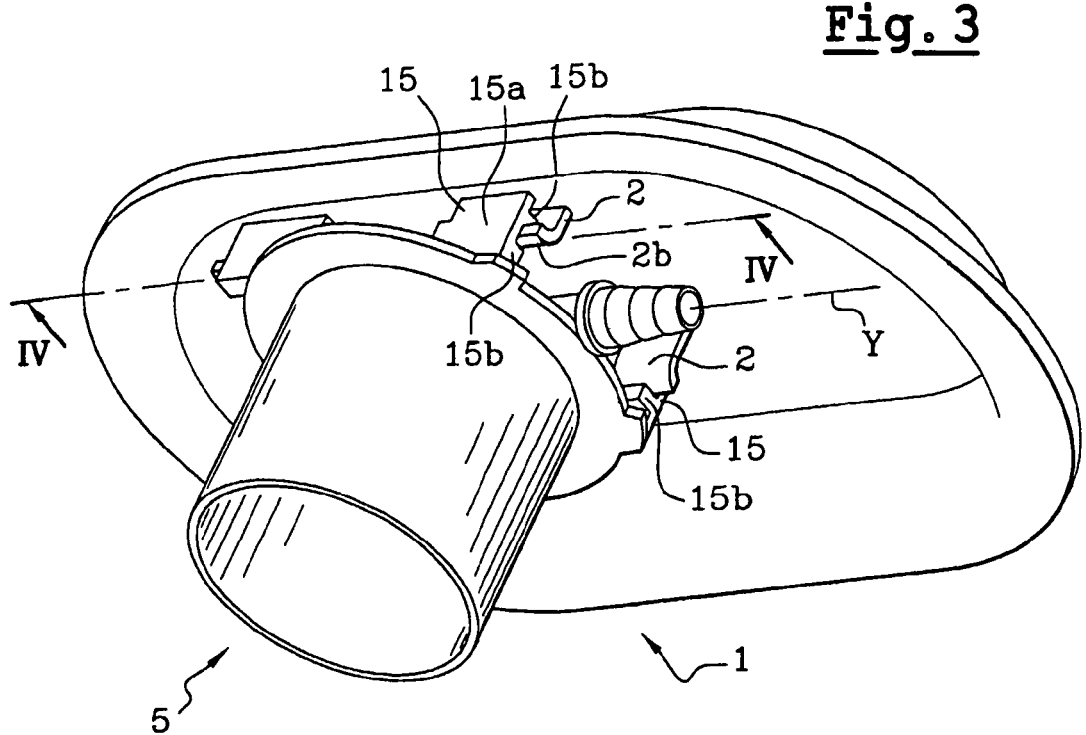
Figure 4A:
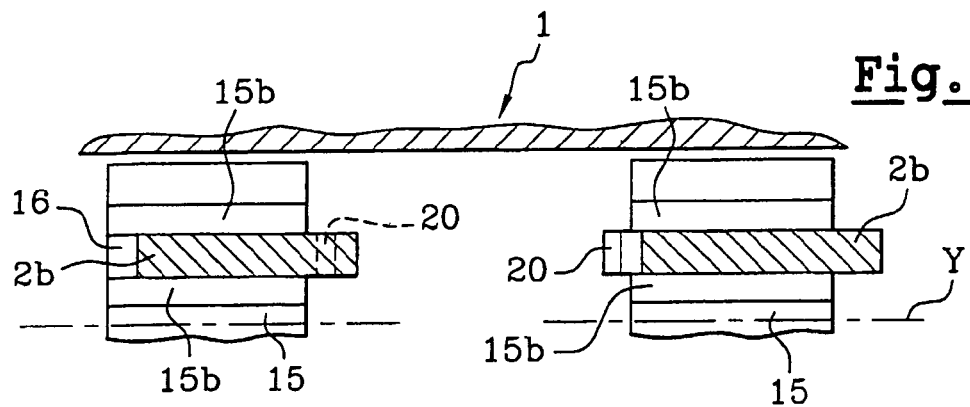
Figure 4B:
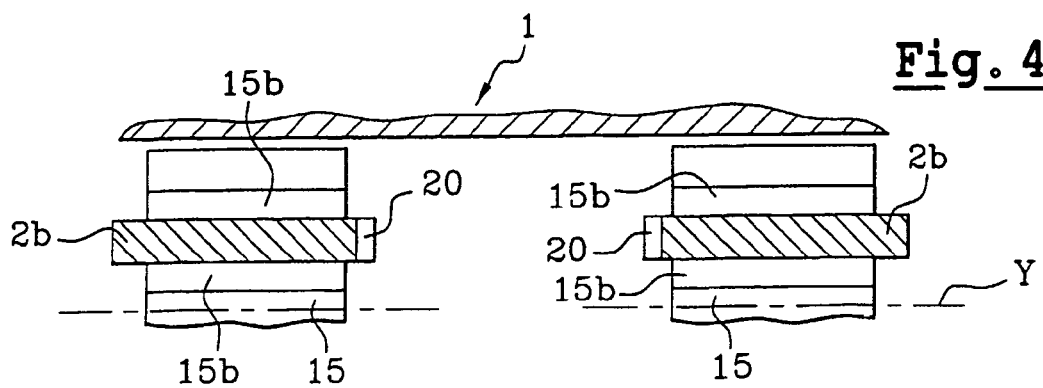
Figure 5:
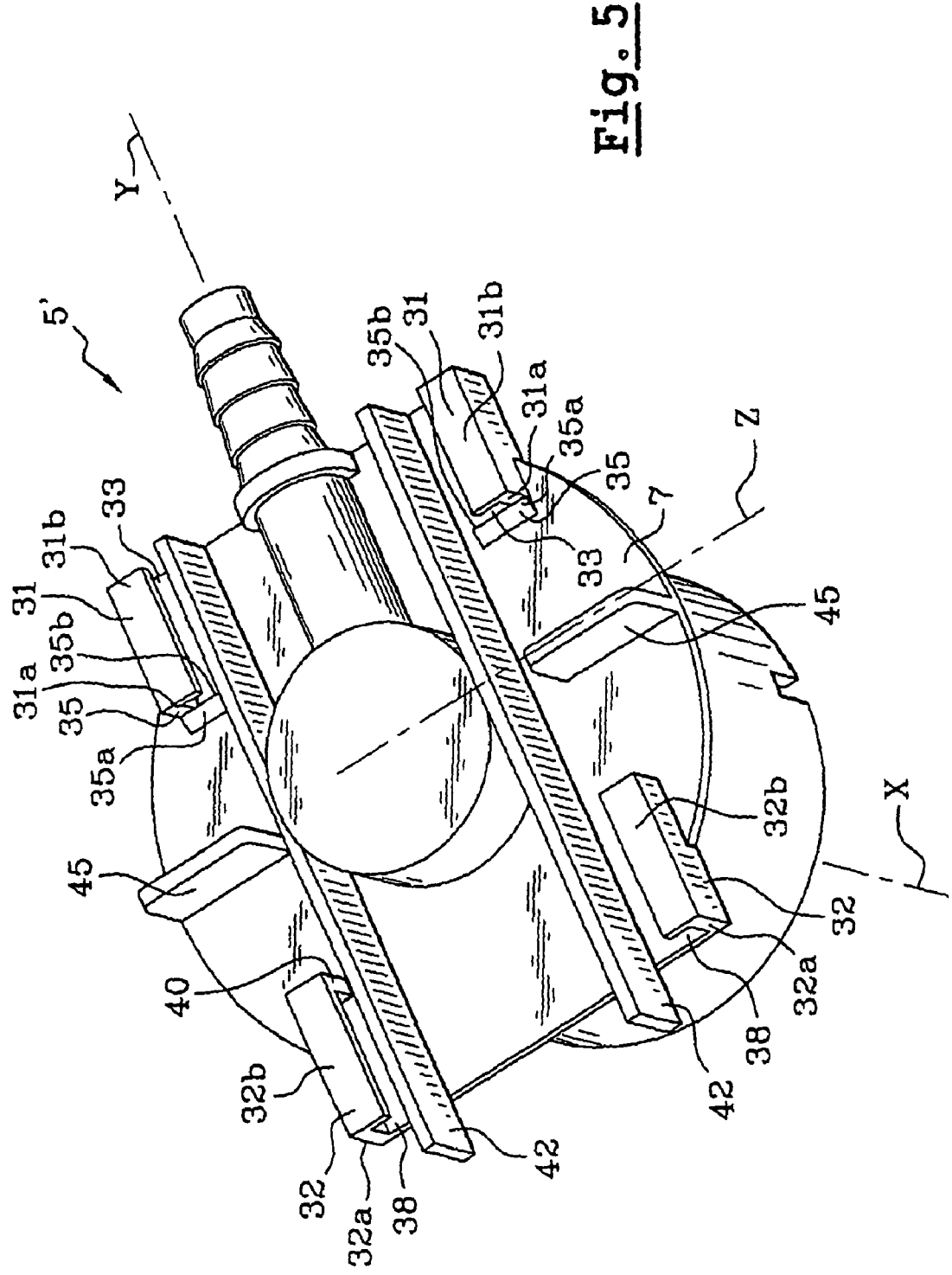
Figure 6:
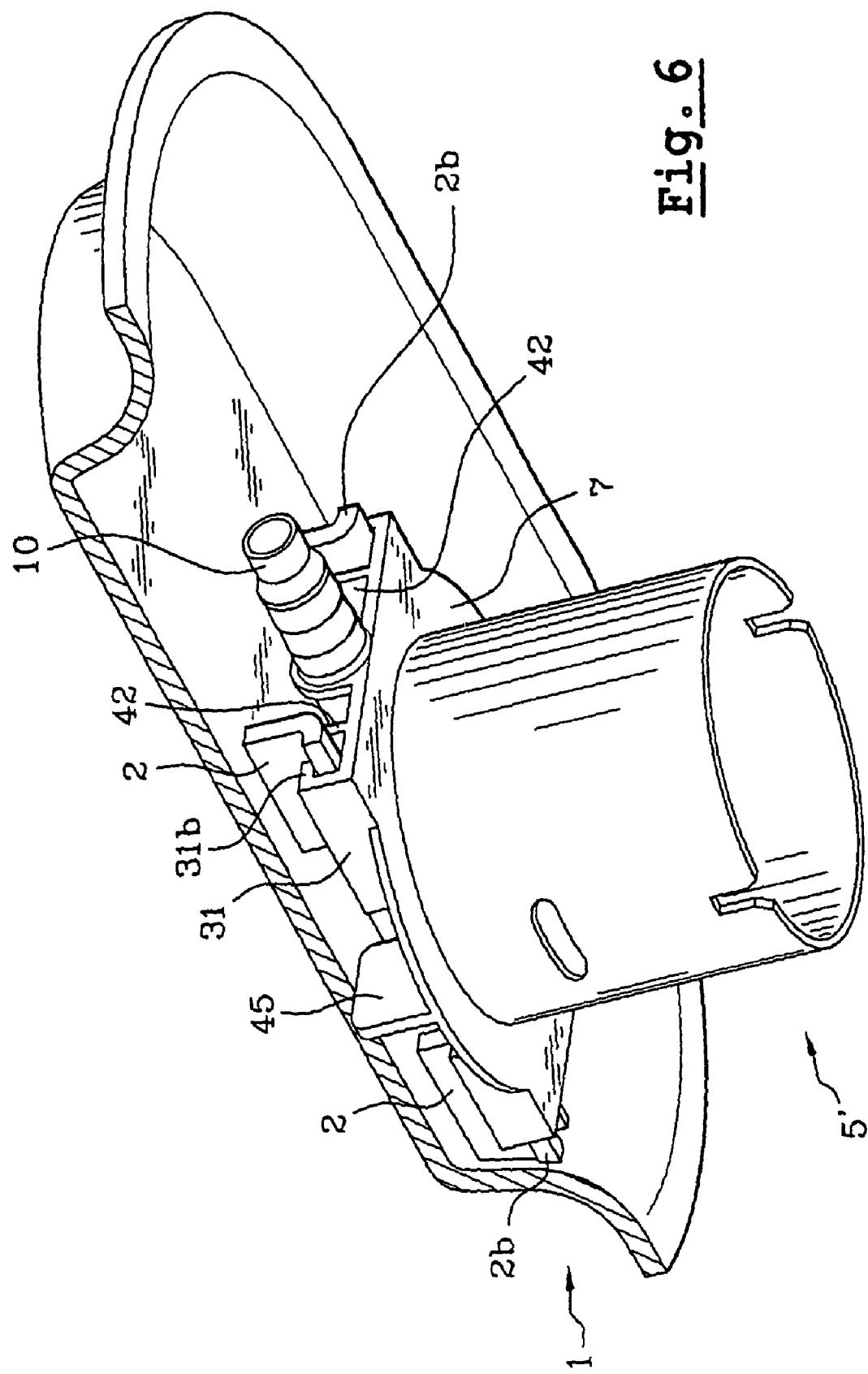
Figure 7:
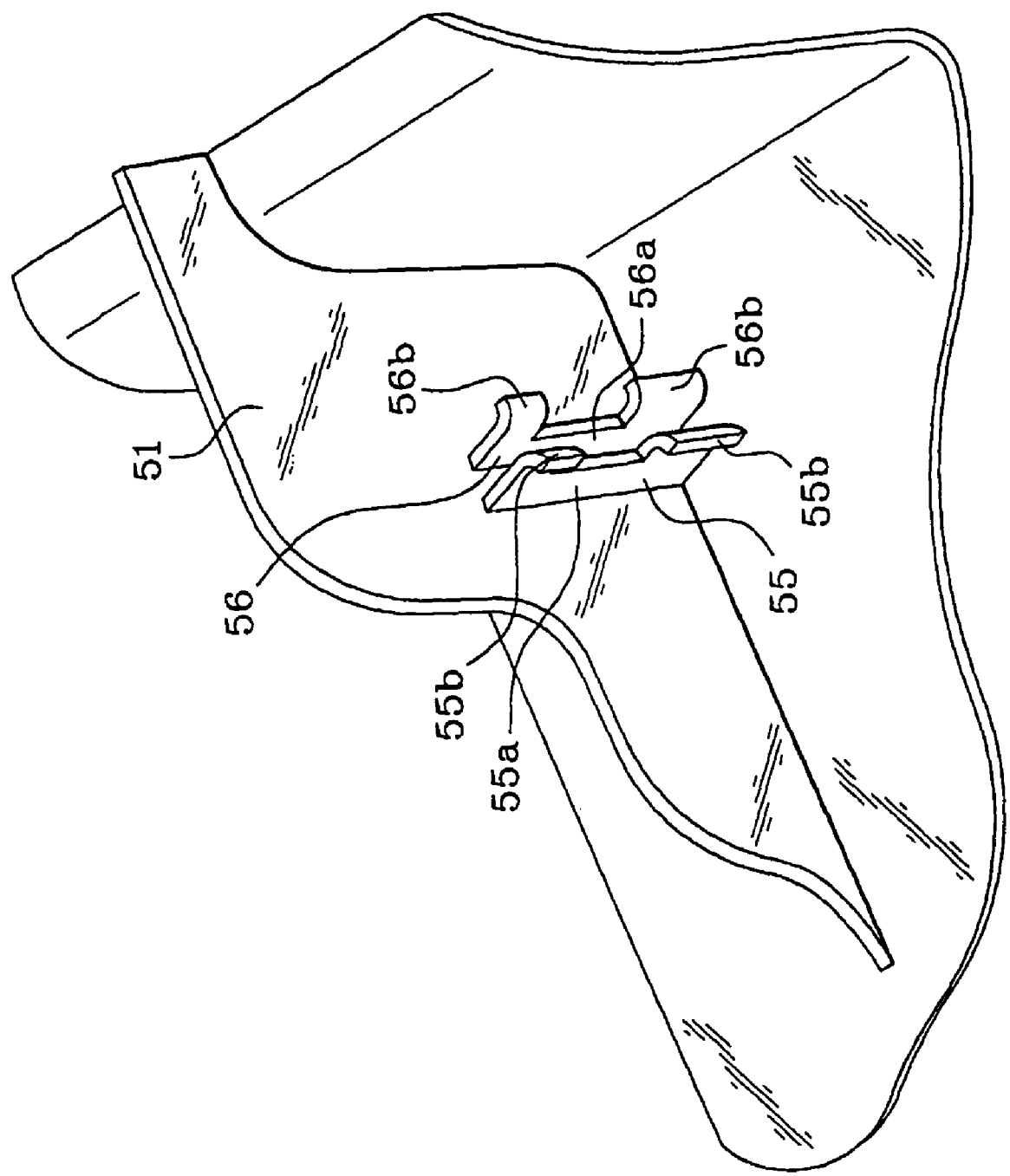
Figure 8:
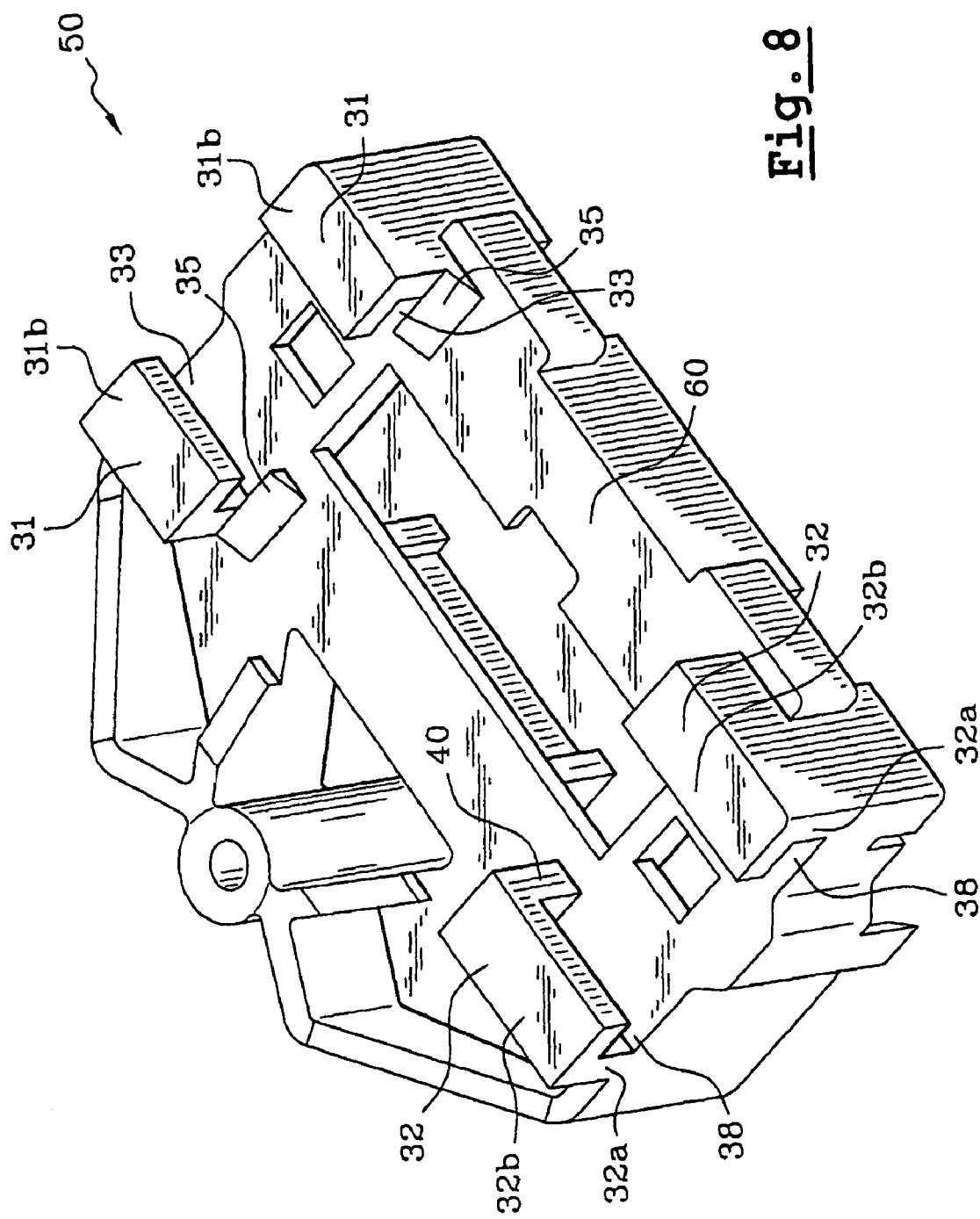
Figure 9:
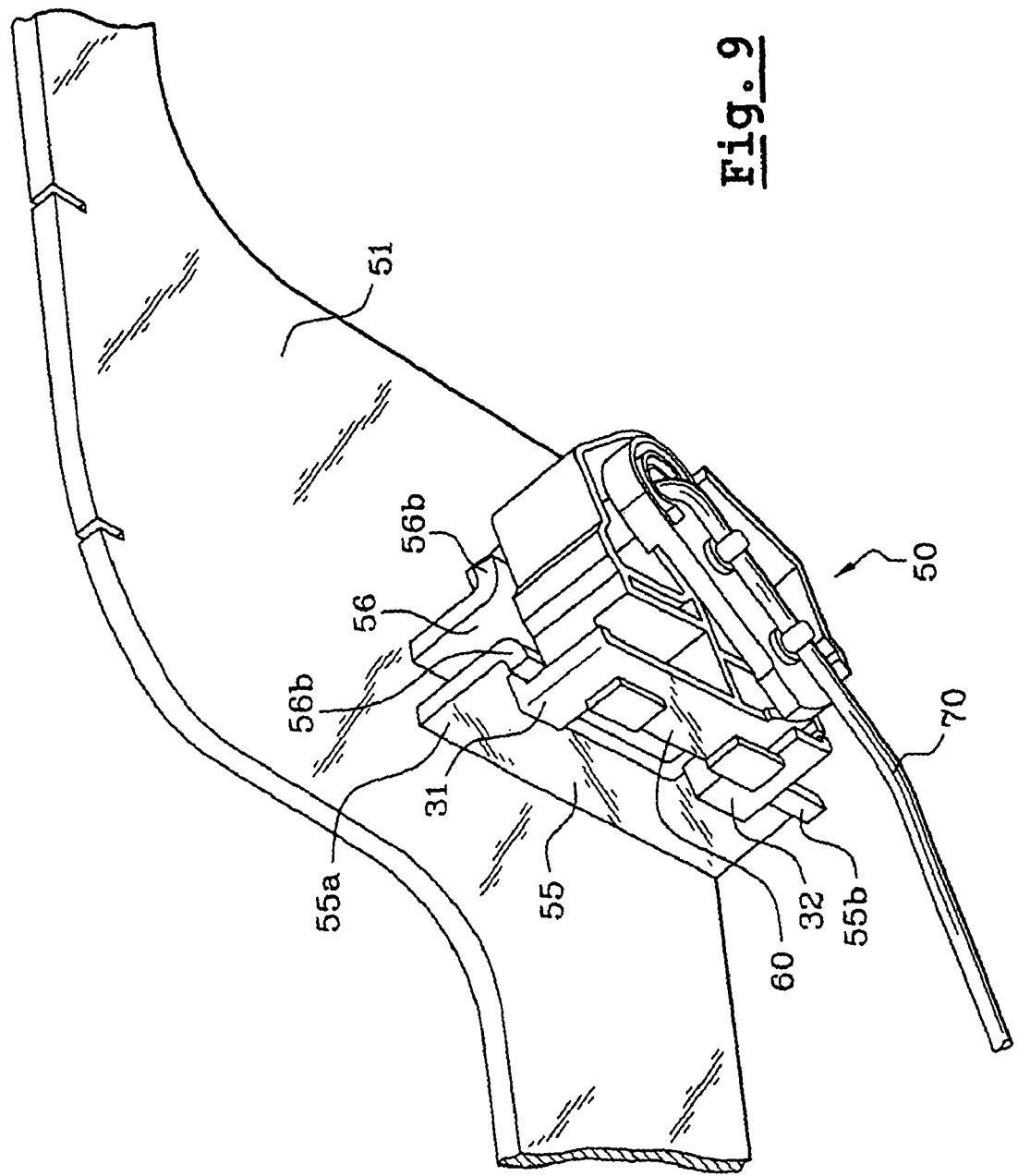
Figure 10:
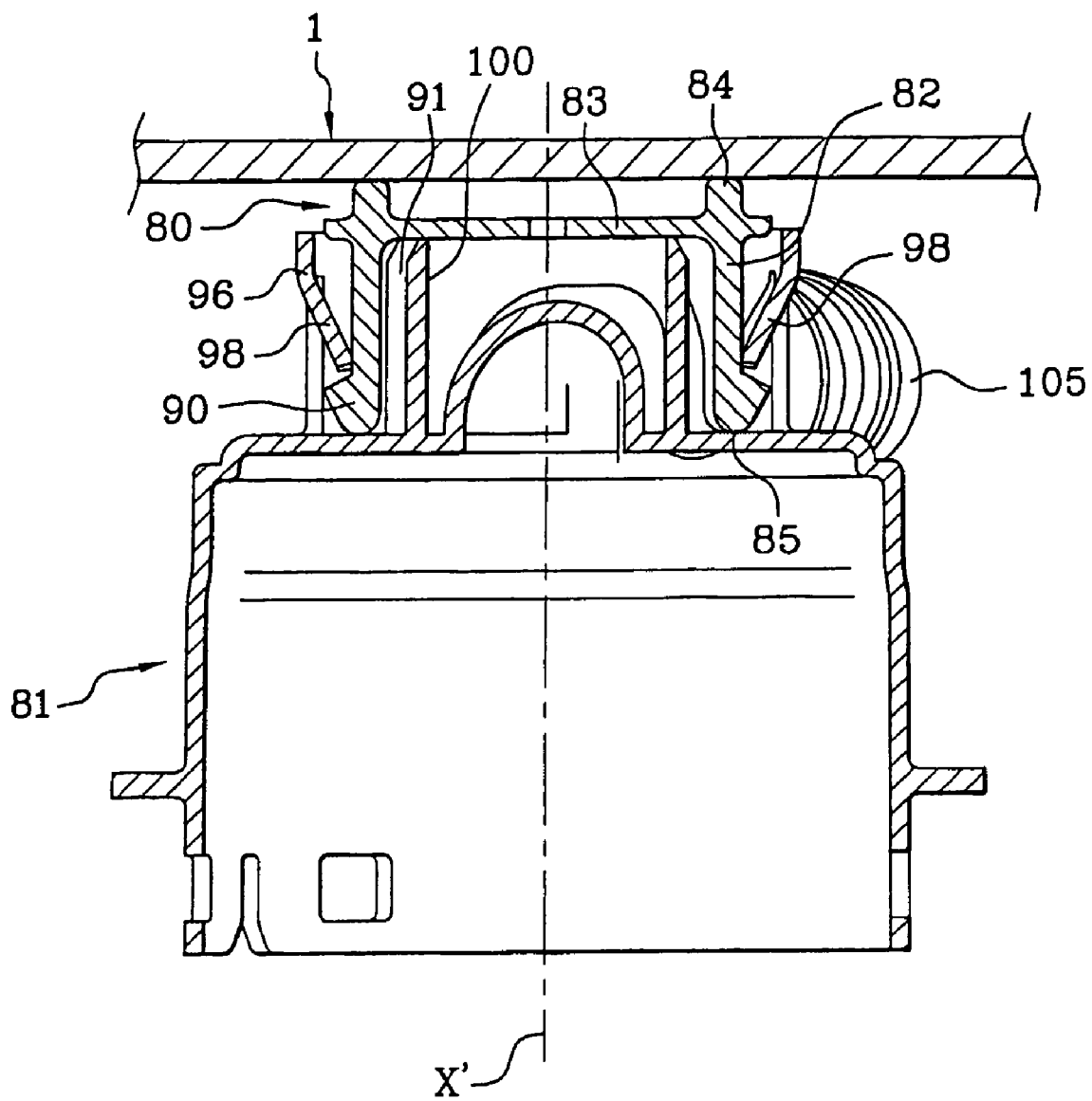

Other features and advantages of the present invention will become apparent on reading the detailed description which will follow relating to non-limiting exemplary embodiments and an examination of the appended drawing, in which;

FIG. 1 is a partial schematic perspective view of a fuel tank casing according to the invention, FIG. 2 is a schematic perspective view of a valve intended to equip the tank of FIG. 1, FIG. 3 is a partial schematic perspective view of the assembly of the valve of FIG. 2 on the casing of the tank, FIGS. 4a and 4b are two partial schematic sections on IV-IV of FIG. 3, corresponding to two steps of the assembly, FIG. 5 is a partial schematic perspective representation of an alternative form of valve intended to equip the casing of FIG. 1, FIG. 6 is a partial schematic perspective view of the casing equipped with the valve of FIG. 5, FIG. 7 is a partial schematic perspective representation of a rib intended to act as a support for a fuel gauge, FIG. 8 is a partial schematic perspective representation of a gauge support intended to be mounted on the rib of FIG. 7, FIG. 9 is a partial schematic perspective representation of the rib equipped with the fuel gauge support, and FIG. 10 is a partial schematic presentation in axial section of the assembly of a retaining member, welded onto the casing of the tank, and of a valve.

FIG. 1 shows a partial representation of a casing 1 of a motor vehicle fuel tank.

The fuel may be of any type and may comprise hydrocarbons and/or alcohols in particular.

In the example described, this casing 1 is produced by injection-moulding non-filled HDPE and may comprise, on the inside, a layer 200 forming a barrier to hydrocarbons, for example an EVOH layer.

The casing 1 comprises a recess 4 having a planar bottom wall to which two pairs 3a and 3b of tabs 2 are connected. The tabs 2 of the casing 1 of the motor vehicle fuel tank are also referred to hereinafter as "tank tabs."

The tabs 2 of the same pair 3a or 3b are situated facing one another and the pairs 3a and 3b are aligned with one another.

Each tab 2 of the pair 3a or of the pair 3b comprises an upright 2a connected perpendicular to the casing 1, and a curved part or bend 2b pointing in the oppose direction to the other tab 2 of the pair 3a or of the pair 3b.

The tabs 2 are intended for retaining on the casing 1 an attached element 5 which in the example described consists of a valve represented in isolation in FIG. 2.

In the example described, this valve is made of HDPE filled with glass fibres or with talc.

The valve 5 comprises a tabular body 6 of axis X connected at one end to a plate 7 perpendicular to the X axis.

On the opposite side to the body 6 this plate supports a nozzle 10 of axis Y perpendicular to the X axis and intended to receive a pipe (not shown).

The plate 7 also supports, on the opposite side to the body 6, two pairs 14*a* and 14*b* of tabs 15, the tabs 15 of each pair 14*a* or 14*b* being arranged facing one another on either side of a mid-plane containing the X and Y axes. The pairs 14*a* and 14*b* are aligned with one another in the direction of the Y axis. The tabs 15 of the element 5 are also referred to hereinafter as "element tabs".

Each tab 15 comprises an upright 15*a* connected perpendicular to the plate 7.

On its face pointing towards the other tab of the same pair, each upright 15*a* comprises two ribs 15*a* parallel to the Y axis, defining between them a groove 16 of axis Y capable of receiving the curved part 2*b* of a tab 2.

Within the meaning of the present invention, the tabs 2 constitute inner bearing surfaces and the tabs 15 outer bearing surfaces.

At that end of the groove 16 which is situated towards the adjacent tab 15, each tab 15 comprises a tooth 20 capable of latching behind a tab 2 of the casing 1.

The valve 5 is positioned on the casing 1 in the following way.

The tabs 15 of the valve are engaged on the tabs 2 of the casing 1 by sliding the curved parts 2*b* into the grooves 16.

The sliding movement thus takes place parallel to the Y axis.

The teeth 20 can be crossed by elastic deformation by the curved parts 2*b* while the valve 5 is being positioned, as illustrated in FIGS. 4*a* and 4*b*.

At the end of the sliding movement, the teeth 20 are housed between the tabs 2 and form stops which, up to a certain point, oppose the translational movement of the valve 5 with respect to the casing 1 along the Y axis. In this position, two of the tabs 15 make up a pair of tabs of the valve 6 that are aligned such that the grooves 16 of each of the two tabs 15 of the pair of tabs of the valve 6 extend along a single line of extension, and each of the two tabs 15 of the pair of tabs of the valve 6 includes a stop 20 that opposes translational movement of the valve 6 when the valve 6 is completely assembled on the casing 1. The stops 20 are positioned between the two tabs 15 of the pair of tabs of valve 6 and along the single line of extension of the grooves 16 of each of the two tabs 15 of the pair of tabs of valve 6.

When fuel is subsequently introduced into the tank, the tabs 2 and 15 come into contact with the fuel.

Since the casing 1 and the tabs 2 are made of unfilled HDPE, they undergo swelling in contact with the fuel.

Because of this swelling, the curved parts 2*b* are immobilized in the ribs 15*b*, these ribs not undergoing any swelling or undergoing a relatively low degree of swelling with relation to that of the casing, the tabs 15 being made of filled HDPE.

The immobilization thus obtained reinforces the retention of the valve 5 on the casing 1.

Without departing from the scope of the present invention, it is possible to modify the shape of the part for assembly of the valve.

FIG. 5 shows a valve 5' comprising a first pair of facing fastening parts, or tabs 31 and a second pair of facing fastening parts, or tabs 32, which are arranged like the four tabs 15 of the previous example but have a different structure from these.

The tabs 31 each comprise a first part 31*a* connected perpendicular to the plate 7, this first part 31*a* being extended by a second curved part 31*b* pointing in the direction of the other tab 31.

The first part 31*a* and second part 31*b* of each tab 31 define with the plate 7 a groove 33 extending longitudinally along the Y axis.

A latching relief 35 is formed on the plate 7 at that end of each groove 33 towards the tabs 32.

Each latching relief 35 (also referred to hereinafter as a "stop") comprises an inclined flank 35*a* which can be crossed by a curved part 2*b* while the valve is being moved over the casing, and a straight flank 35*b* which then opposes the withdrawal of the curved pad 2*b* engaged in the groove 33.

The tabs 32 each comprise first and second parts 32*a* and 32*b* similar to the first and second parts 31*a* and 31*b* and defining, for each tab 32, a groove 38 which extends along the y axis and is intended to receive a curved part 2*b*.

Each tab 32 also comprises a stop 40 situated at that end of the groove 38 towards the tabs 31.

Each stop 40 is connected to the first and second parts 32*a* and 32*b* and to the plate 7, this reinforcing the structure of the tab 32.

The plate 7 additionally supports a pair of ribs 42 connected perpendicularly to this plate and extending on either side of and parallel to the Y axis.

The ribs 42 have a height which has been chosen so as to allow them to bear on the inner surface of the casing 1 when the valve 5' is positioned on the latter, in such a way that the valve 5' is prevented from rotating with respect to an axis Z perpendicular to the X and Y axes.

The plate 7 also supports a pair of ribs 45 connected perpendicularly to this plate, each situated between two tabs 31 and 32 and extending along the Z axis.

These ribs 45 make it possible to prevent the valve 5' from rotating with respect to the casing 1 about the Y axis.

The valve 5' is positioned on the casing 1 by sliding the curved parts 2*b* of the tabs 2 into the grooves 33 and 38 formed by the tabs 31 and 32.

At the end of the sliding movement, the curved parts 2*b* which have slid into the grooves 33 engage behind the latching reliefs 35, bearing on the straight flanks 35*b*, and the curved parts 2*b* which have slid into the grooves 38 bear against the stops 40. In this position, two of the tabs (31 and 32) make up a pair of tabs of the valve 5' that are aligned such that the grooves 33 and 38, respectively of each of the two tabs 31 and 32 of the pair of tabs of the valve 5' extend along a single line of extension, and the two tabs 31 and 32 of the pair of tabs of the valve 5' each respectively include a stop (latching relief 35 of tab 31 and stop 40 of tab 32) that opposes translational movement of the valve 5' when the valve 5' is completely assembled on the casing 1. The stops 35 and 40 are positioned between the two tabs 31 and 32 of the pair of tabs of valve 5' and along the single line of extension of the grooves 33 and 38 of each of the two tabs 31 and 32 of the pair of tabs of valve 5'.

The valve 5' is then immobilized to a certain extent with respect to the casing 1 along the Y axis.

The swelling of the casing 1 then produces additional immobilization of the valve 5' with respect to the casing, in the manner of the previous exemplary embodiment.

The two components of the assembly may additionally be made, from different plastics and not from the same plastic comprising different quantities of fillers.

In another variant, the two components of the assembly are made from the same plastic, for example HDPE, and at least one of the components is arranged in such a way that the swelling of the plastic produces an immobilizing effect on the assembly with the other component.

The assembly of a fuel gauge 50 on a rib 51 of the casing of the tank has been described with reference to FIGS. 7 to 9.

The rib 51 supports two facing fastening parts, or tabs 55 and 56 comprising an upright 55a and an upright 56a respectively, these uprights being connected perpendicular to the rib 51.

The respective uprights 55a and 56a are extended at their upper ends by two respective bends 55b and 56b which are directed away from the tab 56 and the tab 55 respectively.

The fuel gauge 50 comprises a support 60 made of polyacetal and represented in isolation in FIG. 8.

This support 60 comprises two tabs 31 and two tabs 32 similar to those of the valve 5' and forming grooves 33 and 38 each intended to receive a bend 55b or 56b.

The support 60 is assembled on the rib 51 in a similar way to the assembly of the valve 5' on the casing 1.

Following his assembly, and as shown in FIG. 9, a rod 70 supporting a float (not shown) is fastened to the support 60.

As a variant, this rod 70 may be fastened to the support 60 before it is positioned on the rib 51.

The final stage of locking the fuel gauge 50 on the tabs 55 and 56 is carried out by bringing the assembly into contact with the fuel.

Of course, the invention is not limited to the exemplary embodiments which have just been described.

It is possible in particular for any type of attached element other than a valve of a fuel gauge to be fastened to the casing, for example a pump or a filter.

The invention may also apply to assembling on the tank two components which are separate from the casing.

Such an assembly has been represented with reference to FIG. 10 and this assembly comprises a retaining member 80 welded onto the casing 1 of the tank and an a attached element 81 formed by a valve.

In the example described, the retaining element 80 is made from HDPE and the attached element 81 from POM.

The retaining member 80 comprises an axisymmetric tubular wall 82 of axis X' and a transverse wall 83 situated at a relatively small distance from an axial end 84 of the tubular wall 82.

The retaining member 80 is welded to the casing 1 by its upper end 84.

At its lower end 85, the tubular wall 82 has fastening parts, or an annular bulge 90 directed radially outwards.

The tubular wall 82 and transverse wall 83 define a housing 91 opening downwards and allowing the upper part of the attached element 81 to be received, this element comprising an outer skirt 96 of axis X' and elastically deformable fastening parts, or tabs 98. These tabs bear on the bulge 90.

The valve 81 additionally comprises an inner skirt 100, likewise of axis X', engaged in the tubular wall 82 and bearing against the transverse wall 83.

The valve 81 is provided with a laterally extending connection nozzle 105 which passes through the inner skirt 100 and outer skirt 96.

The valve 81 is positioned on the retaining member 80 by latching along the X' axis, the tabs 98 crossing the bulge 90 by elastic deformation When fuel is subsequently introduced into the tank, the tabs 98 and the bulge 90 come into contact with the fuel.

Since the bulge 90 is made of HDPE, it undergoes swelling on contact with the fuel and exerts an immobilizing force on the tabs 98 engaged behind it, this reinforcing the retention of the valve 81 on the retaining member 80.

The invention claimed is:

1. An assembly comprising:
   at least two components to be in contact with hydrocarbons, a first of the two components including a fuel tank casing or a retaining member fastened to the fuel tank casing and a second of the two components including an element attached on an inside of the fuel tank casing, the two assembled components each comprising two pairs of tabs positioned so that each tab of said first component interacts with a corresponding tab of said second component when said first and second components are connected to each other,
   wherein each tab of one component defines an open groove and each tab of the other component slides through a corresponding open groove of the one component such that said components can be assembled together along opposed directions according to a location of the two pairs of tabs, and two tabs of the pair of tabs of the one component are aligned such that the grooves of each of the two tabs of the pair of tabs of the one component extend along a single line of extension, and each of the two tabs of the pair of tabs of the one component includes a stop that opposes translational movement of the one component when the one component is completely assembled on the other component, wherein the stops are positioned between the two tabs of the pair of tabs of the one component and along the single line of extension of the grooves of each of the two tabs of the pair of tabs of the one component,
   wherein at least one of the two components is made from a material that exhibits a swelling through action of the hydrocarbons, the tabs being arranged such that the swelling of the at least one of the two components through the effect of hydrocarbons tends to reinforce retention of the two components on one another,
   wherein the fuel tank casing comprises at least one inner layer forming a barrier to said hydrocarbons inside a wall of said fuel tank casing, wherein said inner layer forming the barrier to hydrocarbons reduces hydrocarbon permeation through said fuel tank casing, and the element attached on the inside of the fuel tank casing is attached to said fuel tank casing via said tabs that are attached to an exposed surface of said wall of said fuel tank casing without piercing and without impairing the inner layer forming said barrier inside said wall, and
   wherein the element attached to the inside of the fuel tank casing and said tabs are entirely contained inside the fuel tank casing without portions extending through holes in the fuel tank casing and without portions extending through holes in the inner layer forming the barrier to hydrocarbons.

2. An assembly according to claim 1, wherein the retaining member is fastened to the fuel tank casing by welding.

3. An assembly according to claim 1, wherein the attached element is selected from a valve and a fuel gauge.

4. An assembly according to claim 1, wherein the fastening part tabs of the first component are made of a material having swelling properties that are different from swelling properties of a material for the tabs of the second component.

5. An assembly according to claim 1, wherein the fuel tank casing or the retaining member is made from a material having a greater tendency to swell than a material from which the attached element is made.

6. An assembly according to claim 1, wherein the tabs of the first component are made of a material that is identical to a material for the fastening parts of the second component.

7. An assembly according to claim 1, one of the components including a retaining member welded onto the fuel tank casing of the tank, wherein the retaining member and the fuel tank casing are made from materials having substantially identical swelling properties, being made from a same material.

8. A motor vehicle fuel tank, comprising an assembly as defined in claim 1, the second component including an attached element selected from a valve and a fuel gauge.

9. An assembly according to claim 1, wherein said at least one layer forming said barrier to said hydrocarbons includes an EVOH layer.

10. An assembly according to claim 1, wherein said first component includes said fuel tank casing.

11. An assembly according to claim 1, wherein said inner layer forming the barrier to hydrocarbons is a layer that extends continuously inside said wall.

12. An assembly according to claim 1, wherein said inner layer forming the barrier to hydrocarbons is a layer that extends continuously inside said wall.

13. An assembly according to claim 1, wherein said two pairs of tabs of said first component are four tank tabs attached to said exposed surface of said wall of said fuel tank, each tank tab forming an inner bearing surface, and
wherein said two pairs of tabs of said second component are four element tabs attached to the element attached on the inside of the fuel tank casing, each element tab forming an outer bearing surface that bears against a corresponding inner bearing surface of said tank tabs.

14. An assembly according to claim 1, wherein said two pairs of tabs of said first component are made of HDPE that is free of a filler material and said two pairs of tabs of said second component are made of HDPE that includes a filler material.

15. An assembly according to claim 14, wherein said filler material is glass fibers.

16. An assembly according to claim 14, wherein said filler material is talc.

17. A method of manufacturing a motor vehicle fuel tank, comprising:
assembling two components of the fuel tank before bringing the two components into contact with fuel, the two components each comprising two pairs of tabs positioned so that each tab of said first component interacts with a corresponding tab of said second component when said first and second components are connected to each other, at least one of the two components being made from a material configured to swell through action of the fuel, wherein each tab of one component defines an open groove and each tab of the other component slides through a corresponding open groove of the one component such that said components can be assembled together along opposed directions according to a location of the two pairs of tabs, and two tabs of the pair of tabs of the one component are aligned such that the grooves of each of the two tabs of the pair of tabs of the one component extend along a single line of extension, and each of the two tabs of the pair of tabs of the one component includes a stop that opposes translational movement of the one component when the one component is completely assembled on the other component, wherein the stops are positioned between the two tabs of the pair of tabs of the one component and along the single line of extension of the grooves of each of the two tabs of the pair of tabs of the one component; and
bringing the two components into contact with the fuel to cause a swelling of at least one of the tabs and a reinforcing of retention of one of the two components on the other of the two components,
wherein said first of the two components comprises at least one inner layer inside a wall of said first component, said inner layer forming a barrier to said fuel, wherein said inner layer forming the barrier to hydrocarbons reduces hydrocarbon permeation through said first of the two components and the second of the two components is attached on the first component via the tabs, the tabs of the first component being attached to an exposed surface of said wall of said first component without piercing and impairing the inner layer forming said barrier inside said wall of said first component, and wherein the second of the two components is attached to the first component without portions of said second component and of said tabs extending through holes in the first component and without portions extending through holes in the inner layer forming the barrier to hydrocarbons.

18. An assembly according to claim 10, wherein each tab of said second component defines an open groove configured to receive a curved part of a corresponding tab of said first component.

19. An assembly according to claim 18, wherein said curved part of each tab of said first component received in said open groove of a corresponding tab of said second component undergoes swelling when contacted by said fuel, and wherein said swelling of said portion is more pronounced than a swelling undergone by said tabs of said second component when contacted by said fuel.

20. An assembly according to claim 13, wherein a first tank tab bears against a first element tab, a second tank tab bears against a second element tab and said first and second tank tabs are located between said first and second element tabs, and wherein a third tank tab bears against a third element tab, a fourth tank tab bears against a fourth element tab and said third and fourth tank tabs are located between said third and fourth element tabs.

21. An assembly according to claim 13, wherein said first, second, third and fourth tank tabs are curved outwardly toward said first, second, third and fourth element tabs respectively.

22. An assembly according to claim 13, wherein said first and second tank tabs are curved in opposite directions to each other, and said third and fourth tank tabs are curved in opposite directions to each other.

* * * * *

UNITED STATES PATENT AND TRADEMARK OFFICE
CERTIFICATE OF CORRECTION

PATENT NO. : 7,748,397 B2 Page 1 of 1
APPLICATION NO. : 10/498357
DATED : July 6, 2010
INVENTOR(S) : Eric Firtion et al.

It is certified that error appears in the above-identified patent and that said Letters Patent is hereby corrected as shown below:

Column 8, lines 51-52 (the first and second lines of Claim 4), delete "fastening part."

Signed and Sealed this

Second Day of November, 2010

David J. Kappos
*Director of the United States Patent and Trademark Office*